(12) United States Patent
O'Brien et al.

(10) Patent No.: US 11,136,450 B2
(45) Date of Patent: Oct. 5, 2021

(54) HIGH STRENGTH POLYVINYLIDENE FLUORIDE BASED REINFORCED COMPOUNDS

(71) Applicant: Arkema Inc., King of Prussia, PA (US)

(72) Inventors: Gregory Scott O'Brien, Downingtown, PA (US); Ramin Amin-Sanayei, Malvern, PA (US); Saeid Zerafati, Villanova, PA (US)

(73) Assignee: ARKEMA INC., King Of Prussia, PA (US)

( * ) Notice: Subject to any disclaimer, the term of this patent is extended or adjusted under 35 U.S.C. 154(b) by 54 days.

(21) Appl. No.: 16/630,621

(22) PCT Filed: Jun. 20, 2018

(86) PCT No.: PCT/US2018/038403
§ 371 (c)(1),
(2) Date: Jan. 13, 2020

(87) PCT Pub. No.: WO2019/013934
PCT Pub. Date: Jan. 17, 2019

(65) Prior Publication Data
US 2021/0079206 A1  Mar. 18, 2021

Related U.S. Application Data

(60) Provisional application No. 62/532,554, filed on Jul. 14, 2017.

(51) Int. Cl.
| | | |
|---|---|---|
| *C08F 259/08* | (2006.01) | |
| *C08L 27/16* | (2006.01) | |
| *C08L 27/22* | (2006.01) | |
| *C08K 7/06* | (2006.01) | |
| *C08F 14/22* | (2006.01) | |
| *C08K 3/04* | (2006.01) | |

(52) U.S. Cl.
CPC ............ *C08L 27/16* (2013.01); *C08F 259/08* (2013.01); *C08F 14/22* (2013.01); *C08K 3/04* (2013.01); *C08K 7/06* (2013.01); *C08L 27/22* (2013.01); *C08L 2205/025* (2013.01)

(58) Field of Classification Search
None
See application file for complete search history.

(56) References Cited

U.S. PATENT DOCUMENTS

| | | |
|---|---|---|
| 7,241,817 B2 | 7/2007 | Bonnet et al. |
| 7,351,498 B2 | 4/2008 | Watarai et al. |
| 8,883,898 B2 | 11/2014 | Hochstetter et al. |
| 2010/0189946 A1 | 7/2010 | Hochstetter et al. |
| 2016/0200907 A1 | 7/2016 | Amin-Sanayei et al. |
| 2018/0072829 A1 | 3/2018 | Amin-Sanayei et al. |

FOREIGN PATENT DOCUMENTS

| | | |
|---|---|---|
| WO | WO 2013/110740 A1 | 8/2013 |
| WO | WO 2016/145135 A1 | 9/2016 |
| WO | 2018224583 A1 | 12/2018 |

OTHER PUBLICATIONS

Zhao, Jie et al; "A Comparative Study of Fibre/Matrix Interface in Glass Fibre Reinforced Polyvinylidene Fluoride Composites"; Colloids and Surfaces A: Physiochemical and Engineering Aspects; 2012; vol. 413, pp. 58-64.

Tran M Q, et al ; "Carbon Fibre Reinforced Poly(vinylidene fluoride) : Impact of Matrix Modification on Fiber/Polymer Adhesion"; Composites Science and Technology; Jun. 2008; vol. 68, No. 7-8; pp. 1766-1776.

*Primary Examiner* — Richard A Huhn
(74) *Attorney, Agent, or Firm* — Joanne Rossi

(57) ABSTRACT

The invention relates to the use of chopped fibers in thermoplastic composite compounds, and in particular to thermoplastic fluoropolymer compounds. The fluoropolymer matrix contains thermoplastic fluoropolymers that have been grafted with a carboxylic polar functionality, such as KYNAR ADX® polymer from Arkema. The chopped fiber—grafted fluoropolymer composite has increased tensile and flexural strength compared to fluoropolymer compounds that contain no grafted carboxylic grafted fluoropolymer.

19 Claims, No Drawings

HIGH STRENGTH POLYVINYLIDENE FLUORIDE BASED REINFORCED COMPOUNDS

CROSS-REFERENCE TO RELATED APPLICATIONS

This application is a national stage application under 35 U.S.C. § 371 of PCT/US2018/038403 filed Jun. 20, 2018, which claims the benefit of U.S. Provisional Patent Application No. 62/532,554, filed Jul. 14, 2017.

FIELD OF THE INVENTION

The invention relates to the use of chopped fibers in reinforced thermoplastic compounds, and in particular to thermoplastic fluoropolymer compounds. The fluorpolymer matrix contains thermoplastic fluoropolymers that have been grafted with a carboxylic polar functionality. The chopped fiber—grafted fluoropolymer compound has increased tensile and flexural strength compared to fluoropolymer compounds that contain no grafted carboxylic grafted fluoropolymer.

BACKGROUND OF THE INVENTION

Fluoropolymers, for example those based on vinylidene fluoride $CF_2=CH_2$ (VDF) are known to have excellent mechanical stability properties, very great chemical inertness, low surface energy, electrochemical stability, and good aging resistance. These qualities are exploited in various end-use applications. Unfortunately, due to their inertness, it is difficult to bond fluoropolymers to other materials.

Functional groups have been added to fluoropolymers in order to increase adhesion to other materials, add some level of hydrophilicity and wettability, and provide reactive sites, such as for cross-linking and subsequent chemical modification. Functionality has been added by several means, such as, by direct copolymerization of a functional monomer with the fluoromonomers, and by a post-polymerization grafting mechanism, such as the grafting of maleic anhydride onto a polyvinylidene fluoride homopolymer or copolymer, as is described in U.S. Pat. No. 7,241,817, to form KYNAR® ADX resins available from Arkema Inc. WO 2013/110740 and U.S. Pat. No. 7,351,498 further describe functionalization of a fluoropolymer by monomer grafting or by copolymerization.

Fibers are known for use as reinforcement in many types of polymer composites. Long fibers can be impregnated with a polymer or pre-polymer that serves as s binder to hold the fibers together. The long fibers are dipped or sprayed with polymer binder, and then generally wound onto a mold to form a structure, woven into an inter-locking stricture, or laid into a closed mold. The polymer-coated or impregnated fibers are then consolidated to form the final article. Articles made of long fibers generally contain at least 45 weight percent, preferably more than 50 weight percent, and often more than 60 to 70 weight percent of fiber.
In a continuous fiber article, the properties of the article are dominated by the properties of the fiber—the polymer acting as a binder to hold the fibers together.

U.S. Pat. No. 8,883,898 discloses impregnating continuous fibers with a fluoropolymer that has been functionalized, preferably by grafting with maleic anhydride.

Short fibers, also known as chopped fiber strands, chopped strands, or fiber bundles, contain many strands—generally 2,000 to 10,000 separate fibers, each about 3 to 10 microns in diameter, that are bound together by a polymer sizing—generally about 1 to 5 percent sizing based on the weight of the fibers. These bundles, or rovings, are then cut to about 2 to 15 mm lengths, and more typically 2 to 8 mm lengths. The bundles form a free-flowing material that can be fed to an extruder for compounding, without releasing free fibers. Unsized, or free fibers could not be effectively utilized in a polymer compound such as this invention, especially as the length of the chopped fiber increases. It is therefore required to have sized chopped fiber for compounding with fluoropolymers in this invention. The small bundles of fibers are then added to a polymer matrix as a reinforcement, in order to improve the stiffness of the matrix. The properties of an article containing generally 5 to 25, preferably 8 to 20, weight percent of the fiber bundles, are dominated by the properties of the matrix polymer. For example, while the tensile strength of a 50 weight percent continuous carbon fiber composite might be about 250,000 psi in the direction of the carbon fiber, a composite with 15% short carbon fiber, might have a tensile strength of 15,000 psi.

Different fiber sizings have been developed for different polymer matrices, to improve compatibility between the sized fibers and the matrix polymer. Unfortunately, current fiber sizings have poor compatibility with fluoropolymer. Without good compatibility, and therefore good distribution and good adhesion between the fibers and a fluropolymer matrix, the benefits of using fiber reinforcement have not been fully realized.

Surprizingly, it has now been found that when fluoropolymers are grafted with a carboxylic polar functionality, a fluoropolymer matrices containing the grafted fluoropolymer and short-fiber bundles has enhanced tensile and flexural strength compared to a fluoropolymer composite without the grafted fluoropolymer. The excellent result has been found using different types of fibers (carbon, glass) as well as many different types of sizing. While not being bound by any particular theory, it is believed that the grafted carboxylic functionality forms some type of bonding with the sizing and/or fibers, which provides both good adhesion for property improvement, as well as improved distribution of the fiber bundles within the fluoropolymer matrix.

DETAILED DESCRIPTION OF THE INVENTION

As used herein "copolymer" refers to any polymer having two or more different monomer units, and would include terpolymers and those having more than three different monomer units.

The references cited in this application are incorporated herein by reference. Percentages, as used herein are weight percentages, unless noted otherwise, and molecular weights are weight average molecular weights as measured by GPC using a PMMA reference, unless otherwise stated.

The invention relates to fluoropolymer compounds containing short fiber bundle or chopped fiber reinforcement, where the fluoropolymer matrix contains fluoropolymer that has been grafted with a polar carboxylic functionality.
Fluoropolymer:

Fluoropolymers useful in the invention are thermoplastic homopolymers and copolymers having greater than 50 weight percent of fluoromonomer units by weight, preferably more than 65 weight percent, more preferably greater than 75 weight percent and most preferably greater than 90 weight percent of one or more fluoromonomers. Useful fluoromonomers for forming the fluoropolymer include, but are not limited to: vinylidene fluoride (VDF or $VF_2$), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

Especially preferred fluoropolymers are polyvinylidene fluoride (PVDF) homopolymers, and copolymers, such as KYNAR® resins from Arkema Inc. and ethylene tetrafluoroethylene (ETFE) copolymers. While the invention applies to all fluoropolymers and their copolymers, vinylidene fluoride polymers will be used to illustrate the invention. One of ordinary skill in the art will understand and be able to apply the specific references to PVDF to these other thermoplastic polymers, which are considered to be within the realm of, and embodied in the invention.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. In one preferred embodiment, the surfactant is a non-fluorosurfactant, and the final product produced is fluorosurfactant-free. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The PVDF polymerization results in a latex generally having a solids level of 10 to 60 percent by weight, preferably 10 to 50 percent. The latex is generally reduced to a powder form by spray drying, coagulation, or other known process, to produce a dry powder.

Grafted Fluoropolymer:

The fluoropolymer matrix of the invention composite contains some amount of fluoropolymer that has been grafted with a unsaturated carboxylic functional monomer, as described in U.S. Pat. No. 7,241,817. The grafting process involves the steps of:

a) melt blending the fluoropolymer with the unsaturated monomer;
b) forming the blend obtained in a) into films, sheets, granules or powder;
c) exposing the products from step b) are exposed, in the absence of air, to photon (γ) or electron (β) irradiation with a dose of between 1 and 15 Mrad; and
d) the product obtained at c) is optionally treated in order to remove all or part of the unsaturated monomer that has not been grafted onto the fluoropolymer.

The grafted fluoropolymer obtained can be used as such or as a blend either with the same fluoropolymer but not grafted, or with another fluoropolymer. The level of grafted fluoropolymer in the matrix will be from 1 to 100 weight percent, preferably from 3 to 50 weight percent, and most preferably from 5 to 20 weight percent.

Examples of useful unsaturated carboxylic monomers include carboxylic acids having 2 to 20 carbon atoms, such as acrylic acid, methacrylic acid, maleic acid, fumaric acid, and itaconic acid; the functional derivatives of these acids, including but not limited to anhydrides, ester derivatives, amide derivatives, imide derivatives and metal salts (such as alkali metal salts) of unsaturated carboxylic acids. Mention may also be made of undecylenic acid; unsaturated dicarboxylic acids having 4 to 10 carbon atoms and their functional derivatives, particularly their anhydrides, are particularly preferred grafting monomers.

Examples of other grafting monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate.

Advantageously, maleic anhydride is used as the grafting monomer.

Step a) is carried out in any mixing device, such as extruders or mixers used in the thermoplastics industry.

Regarding the proportions of the fluoropolymer and the unsaturated monomer, the proportion of fluoropolymer is advantageously, by weight, from 90 to 99.9% for 0.1 to 10% of unsaturated monomer, respectively. Preferably, the proportion of fluoropolymer is from 92 to 99.0% for 1.0 to 8% of unsaturated monomer, respectively, and more preferably from 1 to 5 weight % of unsaturated grafted monomer.

With regard to step c), the products recovered after step b) are advantageously packaged in polyethylene bags, the air is expelled and then the bags are closed. As regards the method of irradiation, it is equally possible to use electron irradiation, more commonly known as beta irradiation, and photon irradiation, more commonly known as gamma irradiation. Advantageously, the dose is between 2 and 6 Mrad and preferably between 3 and 5 Mrad.

With regard to step d), the ungrafted monomer may be removed by any means. The proportion of grafted monomer with respect to the monomer present at the start of step c) is between 50 and 100%. A washing operation with solvents inert with respect to the fluoropolymer and to the grafted functional groups may be carried out. For example, when maleic anhydride is used for the grafting, chlorobenzene may be used for the washing. It is also possible, more simply, to vacuum degas the product recovered in step c).

Fibers:

Fibers useful in forming the chopped fiber bundles include, but are not limited to, carbon fibers, glass fibers, aramid fibers, polyamide fibers, PEEK or PEKK fibers, carbon nanotubes, and mixtures thereof.

The chopped fiber bundles have been sized. The sizing serves both to adhere the fibers to the other fibers in the bundle, as well as a compatibilizer of the chopped fiber bundle with a polymer matrix.

PYROFIL™ Chopped Fiber is available from Mitsubishi Rayon Co., Ltd. Standard small-tow PYROFIL™ Chopped Fiber may comprise a sizing agent selected from the group consisting of urethane, polyamide, epoxy, water, or water dispersable polyamide. Most manufacturers do not describe the type of sizing that they use, so it is not clear what sizing is being used. Further details as well as standard large-tow and intermediate modulus-tow carbon fibers are detailed below:

| ITEM | Carbon Fiber | Sizing Type | Sizing Ratio | Fiber Length | Preferable Matrix Resin |
|---|---|---|---|---|---|
| TR06U | Standard Small-Tow | Urethane | 2.5% | 6 mm | ABS, PC, PBT, etc |
| TR06NE | | Polyamide | 3.0% | 6 mm | PA, PPS, PEI, PES, etc |
| TR06Q | | Epoxy | 2.5% | 6 mm | POM, PC, PPE, etc |
| TR066A | | Epoxy | 3.0% | 6 mm | PPS, PC, PET, ABS, Thermoset |
| TR03CM | | Water | 12.0% | 6 mm | Inorganic material, Papar, Phenol |
| TR03M | | Water Dispersible Polyamide | 1.5% | 3 mm | Inorganic material, Papar, Phenol |
| TR06UL | Standard Large-Tow | Urethane | 2.5% | 3 mm | ABS, PC, PBT, etc |
| TR06NL | | Polyamide | 3.0% | 6 mm | PA, PPS, PEI, PES, etc |
| TR06YL | | Modified Epoxy | 4.2% | 6 mm | PPS, etc |
| TR06QL | | Modified Epoxy | 2.5% | 6 mm | POM, PC, PPE, etc |
| MR03NE | Intermediate Modulus-Tow | Polyamide | 3.0% | 3 mm | PA, PPS, PEI, PES, etc |

Chopped carbon fiber is also available from Nippon Polymer Sangyo Co., Ltd. Carbon fiber may be purchased that has been sized with a sizing agent consisting of urethane, epoxy and urethane, epoxy, olefin, acrylic, or acrylic and urethane. The sizing agent may be in a variety of concentrations. Sizing from Nippon Polymer Sangyo Co., Ltd. may be 1.5%, 3%, or 5% by weight of the sizing agent. Further details on Nippon Polymer Sangyo Co., Ltd. may be found in the table below:

| Grade | Type | Sizing Agent | Content % | Cut Length mm | Package (kg/bag) | Main Application |
|---|---|---|---|---|---|---|
| CF-N | — | — | max 0.5 | 3-50 | 20 | Carbon Paper |
| CFU | LC MC HC | Urethane | LC: 1.5 MC: 3.0 HC: 5.0 | 3-12 | | ABS, PBT, PP, PC, PA |
| CFEPU | | Epoxy + Urethane | | | | PBT, PC, PA, PPO |
| CFEPP | | Epoxy | | | | PBT, PC, PA, POM |
| CFOF | | Olefin | | | | PP, PPA, PPS, PI, PA6T |
| CFA4 | | Acrylic | | | | PP, PPA, PPS, PI, PA6T, PEEK |
| CFAU* | | Acrylic + Urethane | | | | PP, PPA, PPS, PI, PA6T, PEEK |

*Under Development

The level of chopped fibers blended into the polymer matrix is generally from 5 to 40 percent by weight, more preferably from 8 to 25 percent by weight—based on the polymer/fiber composite.

Generally, the free-flowing fiber bundles are combined with the fluoropolymer matrix in the melt–either dry blended followed by melting in the processing equipment— such as an extruder, or added directly into a polymer melt in what is called "down-stream" addition. In this type of compounding, the polymer if first melted for example in a twin-screw extruder, and then the chopped fibers are added into the melt using what is called a down-stream feeder of side-feeder. This type of compounding is often desirable to reduce fiber breakage during compound production.

The fluoropolymer composite melt can be formed directly into a final article in typical melt-processing equipment, such as an extruder, injection mold process, etc.

The fluoropolymer/chopped fiber composite could also be formed into strands, and cut into pellets that could be latter melt-formed into a final article.

Properties:

The fluoropolymer/chopped fiber compound of the invention has reduced shrinkage and improved stiffness and strength, compared to the fluropolymer without the chopped fibers, and also improved properties over a compound of the chopped fibers in a fluoropolymer matrix that does not contain carboxylic grafted functional groups.

Uses:

The fluoropolymer/chopped fiber composite can be to form a variety of articles in which improved strength, tensile and flexural properties are desired. One of ordinary skill in the art can imagine many uses for the carbon fiber composites, based on the following non-limiting examples. In addition, it is expected that with what the inventors feel is increased adhesion between the fiber and the matrix, that the chemical resistance of these compounds will be improved. Some uses include: but are not limited to articles for molded components, for down-hole, automotive, chemical process industry applications.

EXAMPLES

The following examples should be considered as illustrative and not in limitation thereof.

Control Example 1

A PVDF homopolymer with a melt viscosity of (MFR) 6 kpoise at 100 sec$^{-1}$ was melt compounded on a 30 mm W&P co-rotating twin screw extruder with down-stream addition of a chopped strand carbon fiber. The PVDF was added to the rear of the 36 LD extruder using a loss-in-weight feeder and the carbon fiber was added with a down-stream side stuffer using a loss-in-weight feeder. The temperature of extrusion was held at 230° C. and the rpm for the twin-screw was 200 rpm. The feeds were controlled to produce a final product with 15% by weight of carbon fiber. The pellets were then injection molded at 230° C. melt temperature and a mold temperature of 50 C into ASTM D638 type 1 tensile bars and ASTM D790 flexural bars. Properties were testing according to these ASTM protocols. The results are shown in Table 1.

Example 1

The PVDF used for this trial is a blend labeled in the table at blend 1. A blend of 90% by weight of PVDF homopolymer with a melt viscosity of 6 kpoise at 230 C and 100 sec$^{-1}$ is dry blended with 10% by weight of a Maleic Anhydride grafted PVDF of the same viscosity containing 0.3 to 1.0 weight percent of MAH grafted onto the backbone. This Blend 1 is then compounded with 15% by weight carbon fiber as described in the Control 1 Example and molded and tested in the same way. The results in Table 1 show the benefit of the compatible blend of PVDFs—part with functional and part with non-functional PVDF. The improved adhesion also results in higher elongation to break.

Descriptions:
1) CT-702 is chopped carbon fiber available from Toho Tenax
2) Panex 35 type 83 is chopped carbon fiber available from Zoltek-Toray
3) The maleic anhydride grafted PVDF is KYNAR® ADX120 (or ADX 111) available for Arkema Inc
4) The 6 kpoise PVDF homopolymer in this example was KYNAR® 720 available from Arkema Inc Control 2 uses a different carbon fiber than Control 1. The same processes were followed. Example 2 similarly uses a different carbon fiber than Example 1. The same processes were followed.

TABLE 1

|  | PVDF | Carbon Fiber | Tensile Str (psi) | Elongation (%) | Flexural Strength (psi) |
| --- | --- | --- | --- | --- | --- |
| Control 1 | 6 kpoise | CT-702 | 13250 | 0.9 | 13650 |
| Example 1 | Blend 1 | CT-702 | 18420 | 2 | 28125 |
| Control 2 | 6 kpoise | Panex 35 type 83 | 11470 | 0.8 | 12500 |
| Example 2 | Blend 1 | Panex 35 type 83 | 13200 | 4.1 | 20400 |

What is claimed is:

1. A fluoropolymer compound comprising:
   a) 5 to 40 weight percent of sized chopped fiber, said sized chopped fiber comprising a sizing; and
   b) a matrix comprising grafted functionalized fluoropolymer wherein the grafted fluoropolymer has been grafted with a carboxylic functionality.

2. The fluoropolymer compound of claim 1, wherein said grafted functionalized fluoropolymer is a homopolymer or copolymer having greater than 50 weight percent of vinylidene fluoride, or a copolymer comprising ethylene and tetrafluoroethylene monomer units.

3. The fluoropolymer compound of claim 1, wherein said grafted functionalized fluoropolymer comprises from 3 to 100 weight percent of the weight of the polymer matrix.

4. The fluoropolymer compound of claim 1, wherein said grafted functionalized fluoropolymer comprises from 0.1 to 10 wt % of unsaturated grafted monomer.

5. The fluoropolymer compound of claim 1, wherein the grafted functionalized fluoropolymer comprises from 1 to 5 weight % of unsaturated grafted monomer having carboxylic functionality.

6. The fluoropolymer compound of claim 1, wherein the grafted functionalized fluoropolymer comprises maleic anhydride as the grafted functionality.

7. The fluoropolymer compound of claim 1, wherein the sized chopped fiber is selected from the group consisting of carbon fibers, glass fibers, aramid fibers, and mixtures thereof.

8. The fluoropolymer compound of claim 1, wherein the sized chopped fiber comprises carbon fibers.

9. The fluoropolymer compound of claim 1, wherein the sized chopped fiber comprises glass fibers.

10. The fluoropolymer compound of claim 1, wherein the sizing is selected from the group consisting of urethane, polyamide, epoxy, acrylic, and combinations thereof.

11. The fluoropolymer compound of claim 1, wherein the amount of sized chopped fibers is from 5 to 40 percent by weight based on the weight of the fluoropolymer compound.

12. The fluoropolymer compound of claim 1, wherein the fluoropolymer comprises polyvinylidene fluoride.

13. The fluoropolymer compound of claim 1, wherein the fibers are from 2 to 15 mm in length.

14. The fluoropolymer compound of claim 1, wherein the fibers prior to incorporation into the matrix are free flowing.

15. An article formed from the fluoropolymer compound of claim 1.

16. The fluoropolymer compound of claim 1, where the fluoropolymer comprises polyvinylidene fluoride polymer grafted with maleic anhydride, wherein the sized chopped fiber comprises carbon fiber, wherein said matrix comprises from 5 to 20 weight percent of grafted functionalized fluoropolymer, based on the weight of the polymer matrix.

17. The fluoropolymer compound of claim 14, wherein the tensile strength as determined by ASTM D638, of an ASTM D638 type 1 tensile bar made from the fluoropolymer compound is at least 15% greater than an ASTM D638 type 1 tensile bar made with a polyvinylidene fluoride having the same melt viscosity as the grafted functionalized fluoropolymer and that has not been grafted.

18. The fluoropolymer compound of claim 14, wherein the elongation to break as determined by ASTM D638 of an ASTM D638 type 1 tensile bar made from the fluoropolymer compound is at least 2.2 times that of an ASTM D638 type 1 tensile bar made with a polyvinylidene fluoride having the same melt viscosity as the grafted functionalized fluoropolymer and that has not been grafted.

19. The fluoropolymer compound of claim 1, wherein the sized chopped fiber is selected from the group consisting of carbon fibers, glass fibers, aramid fibers, polyamide fibers, PEKK, PEEK, silica fibers, and mixtures thereof.

* * * * *